(12) United States Patent
Maehara

(10) Patent No.: US 11,198,329 B2
(45) Date of Patent: Dec. 14, 2021

(54) HEAVY DUTY TIRE AND METHOD FOR MANUFACTURING THE SAME

(71) Applicant: Sumitomo Rubber Industries, Ltd., Kobe (JP)

(72) Inventor: Atsushi Maehara, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 548 days.

(21) Appl. No.: 15/891,020

(22) Filed: Feb. 7, 2018

(65) Prior Publication Data
US 2018/0222255 A1  Aug. 9, 2018

(30) Foreign Application Priority Data

Feb. 8, 2017 (JP) .............................. JP2017-021478
Dec. 1, 2017 (JP) .............................. JP2017-231954

(51) Int. Cl.
*B60C 11/11* (2006.01)
*B60C 11/13* (2006.01)
(Continued)

(52) U.S. Cl.
CPC ...... *B60C 11/0083* (2013.01); *B29D 30/0606* (2013.01); *B60C 3/04* (2013.01);
(Continued)

(58) Field of Classification Search
CPC ... B60C 11/0083; B60C 3/04; B60C 11/1369; B60C 2011/0358; B60C 2011/036;
(Continued)

(56) References Cited

U.S. PATENT DOCUMENTS 4,408,648 A * 10/1983 Ohashi .................. B60C 13/003
  152/454
5,200,006 A *  4/1993 Takehara ................ B60C 3/04
  152/454
(Continued)

FOREIGN PATENT DOCUMENTS

JP       02204103 A  *  8/1990
JP       03099903 A  *  4/1991  ......... B60C 11/0083
(Continued)

OTHER PUBLICATIONS

Machine Translation: JP-06227212-A; Numata, Kazuoki; (Year: 2020).*
(Continued)

*Primary Examiner* — Kendra Ly
(74) *Attorney, Agent, or Firm* — Birch, Stewart, Kolasch & Birch, LLP

(57) ABSTRACT

A heavy-duty tire includes a tread portion including a crown land portion, a shoulder land portion with a tread edge and a middle land portion disposed therebetween. In a tire cross-section of a 5% inflated state, the tread portion comprises a surface profile which comprises an inner arc portion having a radius (R1) of curvature with a center located in a tire equatorial plane and an outer arc portion having a radius (R2) of curvature smaller than the radius (R1) of curvature of the inner arc portion and intersecting the inner arc portion at an inflection point (P). The inflection point (P) is located on the middle land portion, wherein a distance (Lp) in the tire axial direction from the tire equatorial plane to the inflection point (P) is in a range of from 0.35 to 0.50 times a tread half-width (Wt).

15 Claims, 6 Drawing Sheets

(51) Int. Cl.
    *B60C 11/00*     (2006.01)
    *B60C 11/03*     (2006.01)
    *B29D 30/06*     (2006.01)
    *B60C 9/28*     (2006.01)
    *B60C 3/04*     (2006.01)

(52) U.S. Cl.
    CPC ............ *B60C 9/28* (2013.01); *B60C 11/0306* (2013.01); *B60C 2011/0365* (2013.01); *B60C 2011/0367* (2013.01); *B60C 2200/06* (2013.01)

(58) Field of Classification Search
    CPC ..... B60C 2011/0362; B60C 2011/0365; B60C 2011/0367; B60C 2011/0369; B60C 2011/0372; B60C 2011/0374; B60C 2011/0376; B60C 2011/0379; B60C 2011/1361
    See application file for complete search history.

(56) References Cited

U.S. PATENT DOCUMENTS

| | | | | |
|---|---|---|---|---|
| 5,316,062 A | * | 5/1994 | Lurois | B60C 11/0309 152/209.22 |
| 5,458,173 A | * | 10/1995 | Yamashita | B60C 9/2006 152/209.14 |
| 2005/0006018 A1 | * | 1/2005 | Maruoka | B60C 15/06 152/454 |
| 2011/0083777 A1 | * | 4/2011 | Hidrot | B60C 11/124 152/209.17 |
| 2011/0192513 A1 | * | 8/2011 | Hamada | B60C 3/04 152/209.18 |
| 2012/0216931 A1 | * | 8/2012 | Shiono | B60C 11/12 152/209.18 |
| 2013/0098519 A1 | * | 4/2013 | Maehara | B60C 11/1204 152/209.22 |
| 2015/0151583 A1 | * | 6/2015 | Takahashi | B60C 11/04 152/209.18 |
| 2015/0343848 A1 | * | 12/2015 | Washizuka | B60C 11/12 152/209.18 |

FOREIGN PATENT DOCUMENTS

| | | | | |
|---|---|---|---|---|
| JP | 06024210 A | * | 2/1994 | |
| JP | 06171319 A | * | 6/1994 | |
| JP | 06227212 A | * | 8/1994 | |
| JP | 8-2210 A | | 1/1996 | |
| JP | 2005329795 A | * | 12/2005 | ............. B60C 11/01 |
| JP | 2006111091 A | * | 4/2006 | |
| JP | 2007-331439 A | | 12/2007 | |
| JP | 2016203747 A | * | 12/2016 | |
| WO | WO-9858810 A1 | * | 12/1998 | ......... B60C 11/0083 |

OTHER PUBLICATIONS

Machine Translation: JP-03099903-A; Yamada, Munemitsu (Year: 2020).*
Machine Translation: JP-02204103-A; Takada, Yoshiyuki; (Year: 2020).*
Machine Translation: JP-06024210-A; Mitsuyoshi, Isao; (Year: 2020).*
Machine Translation: JP-06171319-A; Numata, Kazuoki; (Year: 2020).*
Machine Translation: JP-2016203747-A, Kanetani Shiki, (Year: 2021).*
Machine Translation: JP-2005329795-A; Gojo, Atsushi; (Year: 2021).*
Machine Translation: JP-2006111091-A; Takehara, Akira; (Year: 2021).*

* cited by examiner

HEAVY DUTY TIRE AND METHOD FOR MANUFACTURING THE SAME

BACKGROUND ART

Field of the Invention

The present disclosure relates to a heavy duty tire capable of improving tread crown wear resistance and a method for manufacturing the same.

Description of the Related Art

In heavy duty tires which are used for commercial vehicles, tire life is one of the most important properties.

Since heavy duty tires mounted on drive axles of vehicles forward straight traveling direction mainly (i.e. not steered), the tread crown regions of tires tend to be kept receiving large ground contact pressure. Thus, tread crown regions of the tires as such tend to be worn early, resulting in tire replace. Consequently, improving tread crown wear resistance leads to long life for heavy duty tires.

As one technique to improve tread crown wear resistance, it has been proposed to flatten circumferential end contours of the shape of a tread ground contact patch, e.g., making close to approximate rectangular shape in order to reduce ground contact pressure acting on the tread crown region.

In a certain region, e.g., North America, heavy duty tires mounted on drive axles may have to be used under light load condition due to load regulations. In particular, North America obligates that tires mounted on drive axles are subjected to be used under the condition where light load of 60% or less of the load index is loaded. In such a condition, ground contact patches of tread portions of tires may not be close to approximate rectangular shape since a ground contact area on the shoulder regions is reduced upon grounding. Thus, tread crown wear tends to occur as compared with the condition in which the tires are used under a heavy load condition where load corresponding to substantially load index is loaded.

Japanese Unexamined Patent Application Publications H08-002210 and 2007-331439 may be referenced as related Art.

SUMMARY OF THE INVENTION

The present disclosure has been made in view of the above circumstances and has an object to provide a heavy duty tire capable of improving tread crown wear resistance and a method for manufacturing the same.

In one aspect of the disclosure, a heavy-duty tire includes a tread portion having a pair of tread edges, a pair of bead portions each with a bead core therein, a pair of sidewall portions, a carcass extending between the pair of bead cores through the tread portion and the pair of sidewall portions, and a belt layer disposed outwardly in a tire radial direction of the carcass in the tread portion and including three or four belt plies of belt cords. The tread portion is provided with a plurality of main grooves extending in a tire circumferential direction to form a crown land portion, a shoulder land portion including one of the pair of tread edges and a middle land portion disposed between the crown land portion and the shoulder land portion. In a tire cross-section of a 5% inflated state in which the tire is mounted on a standard wheel rim and is inflated to 5% of a standard pressure, the tread portion includes a surface profile which includes an inner arc portion having a radius R1 of curvature with a center located in a tire equatorial plane and an outer arc portion having a radius R2 of curvature smaller than the radius R1 of curvature of the inner arc portion and intersecting the inner arc portion at an inflection point P. The inflection point P is located on the middle land portion, wherein a distance Lp in the tire axial direction from the tire equatorial plane to the inflection point P is in a range of from 0.35 to 0.50 times a tread half-width Wt which is a distance in the tire axial direction from the tire equatorial plane to said one of the pair of tread edges.

In another aspect of the disclosure, a ratio R2/R1 of the radius R2 of curvature to the radius R1 of curvature may be in a range of from 0.14 to 0.20.

In another aspect of the disclosure, the belt plies may include a first belt ply, a second belt ply and a third belt ply arranged in sequence from inside to the outside in the tire radial direction, the second belt ply may have the greatest width in the belt plies, and a half width of the second belt ply may be in a range of from 0.80 to 0.95 times the tread half-width.

In another aspect of the disclosure, the tire may have an aspect ratio equal to or less than 80%.

In another aspect of the disclosure, the shoulder land portion may be provided with a plurality of shoulder lateral grooves traversing the shoulder land portion, and shoulder lateral grooves each may have depths equal to or less than 3.0 mm.

In another aspect of the disclosure, a method for manufacturing a heavy-duty tire, the tire including a tread portion having a pair of tread edges, a pair of bead portions each with a bead core therein, a pair of sidewall portions, a carcass extending between the pair of bead cores through the tread portion and the pair of sidewall portions, and a belt layer disposed outwardly in a tire radial direction of the carcass in the tread portion and including three or four belt plies of belt cords, wherein the tread portion is provided with a plurality of main grooves extending in a tire circumferential direction to form a crown land portion, a shoulder land portion including one of the pair of tread edges and a middle land portion disposed between the crown land portion and the shoulder land portion, the method includes a vulcanizing step to vulcanize a raw tire using a tire mold to mold said heavy duty tire.

The tire mold includes a tread molding surface including a profile which includes an inner tire-mold arc portion having a radius $R1_K$ of curvature with a center located in a tire-mold equatorial plane and an outer tire-mold arc portion having a radius $R2_K$ of curvature smaller than the radius $R1_K$ of curvature of the inner tire-mold arc portion and intersecting the inner tire-mold arc portion at an inflection point $P_K$, and the inflection point $P_K$ is located on a middle land portion forming surface of the tire mold for molding the middle land portion.

A distance $Lp_K$ in a tire-mold axial direction from the tire-mold equatorial plane to the inflection point $P_K$ is in a range of from 0.35 to 0.50 times a tire-mold tread half-width $Wt_K$ which is a distance in the tire-mold axial direction from the tire-mold equatorial plane to a tread edge forming position of the tire mold for molding said one of the tread edges.

In another aspect of the disclosure, a ratio $R2_K/R1_K$ of the radius $R2_K$ of curvature to the radius $R1_K$ of curvature may be in a range of from 0.14 to 0.20.

In another aspect of the disclosure, the tire mold has a tire-mold clip width WF and a tire-mold width WE between a pair of sidewall maximum-width portions of a pair of sidewall molding surfaces for molding the pair of sidewall portions, and a ratio WE/WF of the tire-mold width WE to the tire-mold clip width WF may be in a range of from 1.27 to 1.37.

In another aspect of the disclosure, the tire mold has a tire-mold clip width WF and radial heights HB from a bead base line to a respective sidewall maximum-width portion of a pair of sidewall molding surfaces for molding the pair of sidewall portions, and a ratio HB/WF of each of the radial heights HB to the tire-mold clip width WF may be in a range of from 0.45 to 0.50.

In another aspect of the disclosure, the tire mold has radial heights HB from a bead base line to a respective sidewall maximum-width portion of a pair of sidewall molding surfaces for molding the pair of sidewall portions.

In the vulcanizing step, the raw tire may be placed in the tire mold such that a ratio HB/HA of each of the radial heights HB to a radial height HA of an inner surface of the carcass at the tire-mold equatorial plane from the bead base line is set in a range of from 0.4 to 0.6.

As used herein, the standard wheel rim is a wheel rim officially approved for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

DESCRIPTION OF THE PREFERRED EMBODIMENTS

An embodiment of the present disclosure will be explained below with reference to the accompanying drawings.

Figure 1:
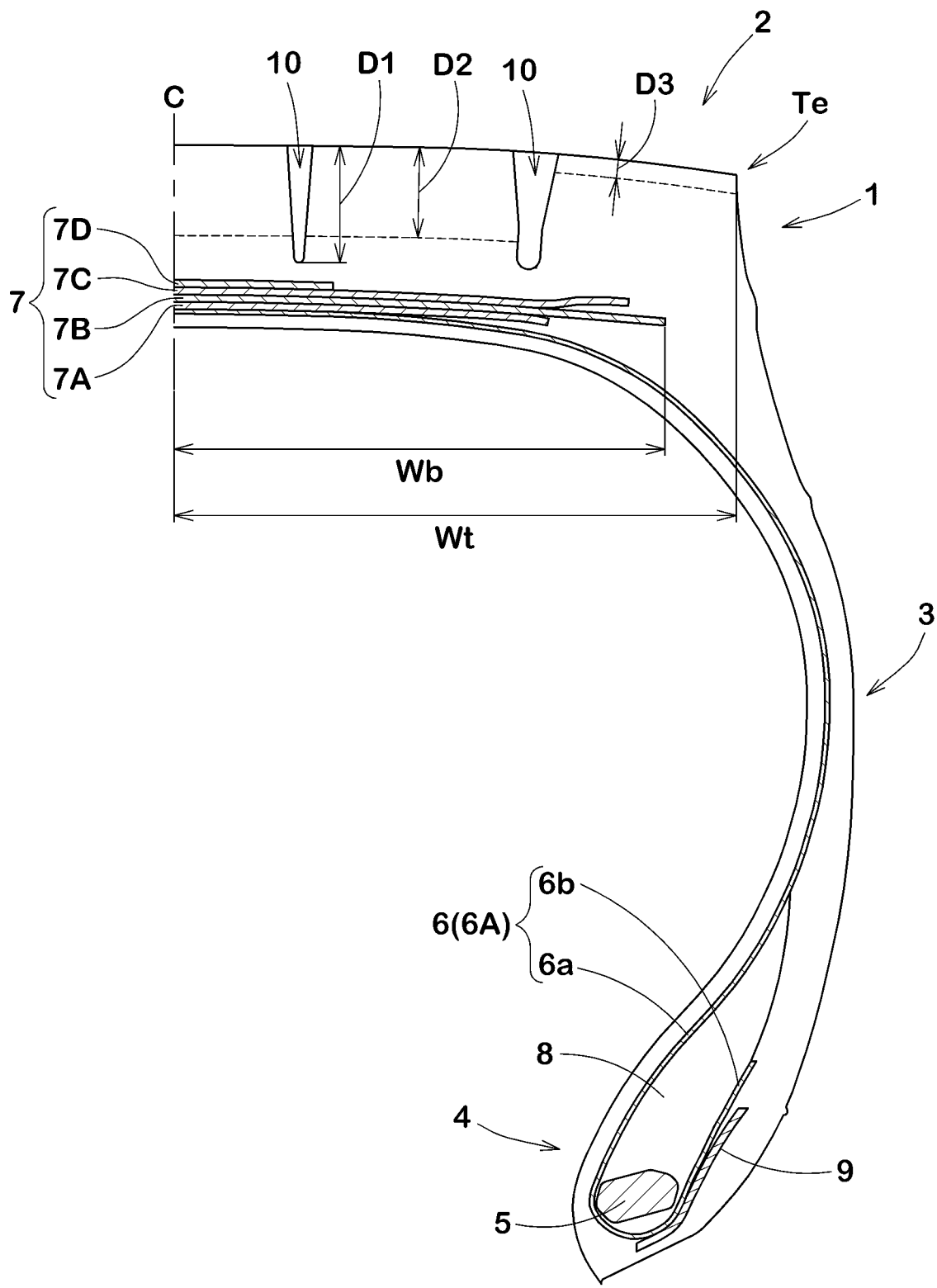
FIG. 1 is a cross-sectional view of a heavy duty tire in accordance with one embodiment of the present disclosure.

As illustrated in FIG. 1, a heavy duty tire 1 in accordance with the present disclosure includes a tread portion 2, a pair of sidewall portions 3, a pair of bead portions 4 each with a bead core 5 therein, a carcass 6 extending between the pair of bead cores 5 of the pair of bead portions 4 through the tread portion 2 and the pair of sidewall portions 3, and a belt layer 7 disposed outwardly in a tire radial direction of the carcass 6 in the tread portion 2. In some preferred embodiments, the heavy duty tire 1 may have a low aspect ratio equal to or less than 80%.

The carcass 6, for example, includes at least one carcass ply 6A of steel carcass cords oriented at angles of 70 to 90 degrees with respect to the tire circumferential direction. The carcass ply 6A includes a main portion 6a extending between the bead cores 5, and a pair of turn-up portions 6b each turned up around the respective bead core 5 from axially inside to the outside of the tire.

The belt layer 7 includes three or four belt plies of belt cords, wherein the belt plies comprise a first belt ply 7A, a second belt ply 7B and a third belt ply 7C arranged in sequence from inside to the outside in the tire radial direction. In this embodiment, a fourth belt ply 7D is arranged outwardly in the tire radial direction of the third belt ply 7C.

The first belt ply 7A may include belt cords oriented at angles $\alpha 1$ in a range of from 45 to 75 degrees with respect to the tire circumferential direction, for example. The second to fourth belt plies 7B to 7D may include belt cords oriented at angles $\alpha 2$ in a range of from 10 to 35 degrees with respect to the tire circumferential direction, for example. The belt cords of second belt ply 7B are inclined in an opposite direction to the belt cords of third belt ply 7C. Thus, belt cords of the second and third belt plies 7B and 7C cross from each other to enhance belt rigidity. In particular, in order to uniform ground contact pressure, it is preferable to suppress dimensional change of the tread portion by increasing binding force of the belt layer 7. Thus, the angles $\alpha 2$ may preferably be equal to or less than 16 degrees (e.g. 15 degrees).

In this embodiment, the second belt ply 7B has the greatest width in the belt plies. Preferably, a half width Wb of the second belt ply 7B may be in a range of from 0.80 to 0.95 times the tread half-width Wt which is a distance in the tire axial direction from the tire equatorial plane C to one of the pair of tread edges Te.

In FIG. 1, a tapering bead apex rubber 8 for reinforcing the bead portion 4 is disposed between the main portion 6a and the turn-up portion 6b in each bead portion 4. A reinforcing cord layer 9 is disposed in each bead portion 4, wherein the cord layer 9 include at least one cord ply of steel cords oriented at angles in a range of from 30 to 60 degrees with respect to the tire circumferential direction.

Figure 2:
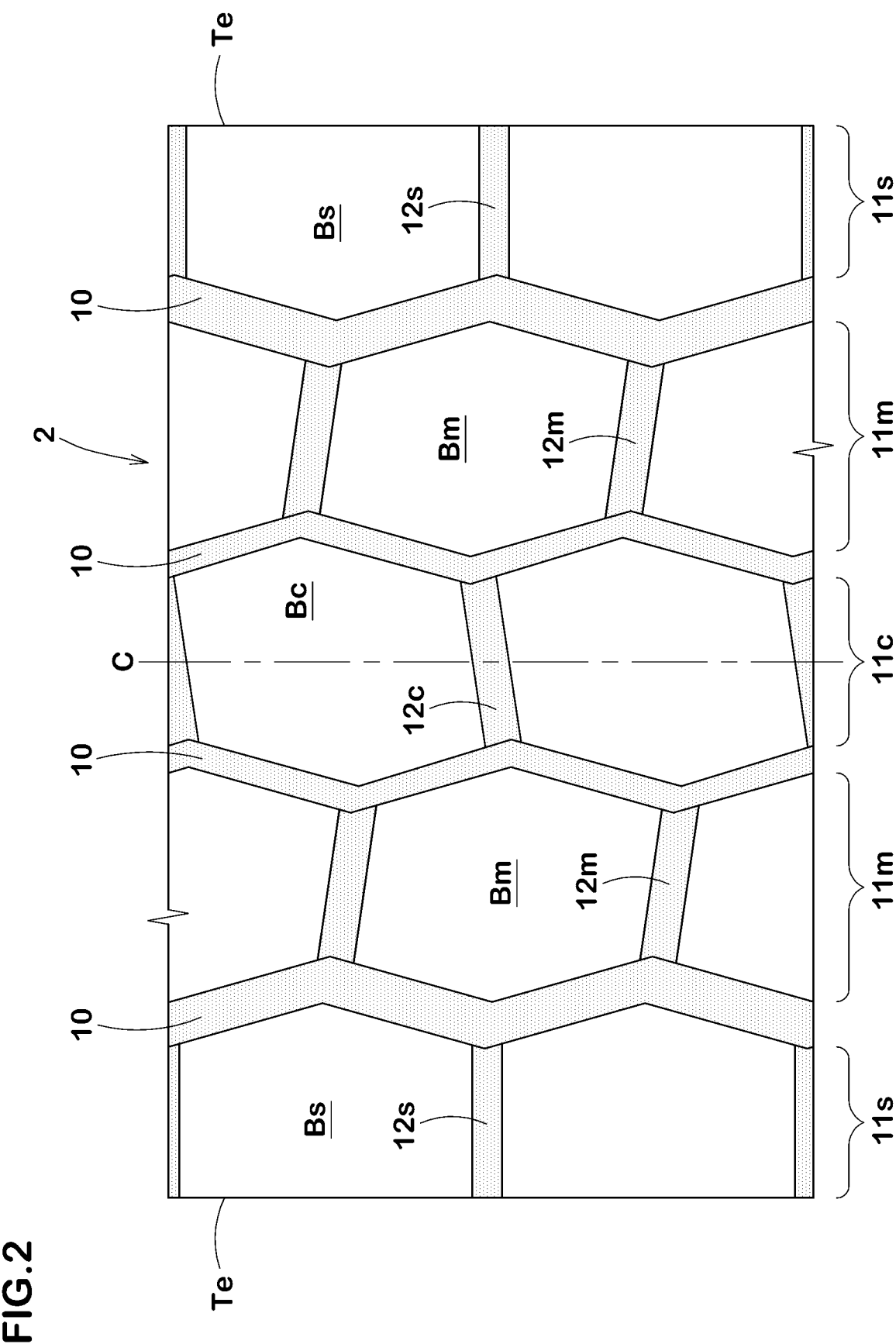
FIG. 2 is a development view of a tread pattern of the tire.

As illustrated in FIG. 2, the tread portion 2 is provided with a plurality of main grooves 10 extending continuously in the tire circumferential direction. Thus, the tread portion 2 is defined into a plurality of land portions which includes a crown land portion 11c arranged nearest to the tire equator C in the land portions, a shoulder land portion 11c arranged nearest to one of the tread edges in the land portions and a middle land portion 11m disposed between the crown land portion 11c and the shoulder land portion 11s. In this embodiment, one crown land portion 11c is arranged on the tire equator C. Alternatively, two crown land portions 11c may be arranged such that the tire equator C is located therebetween.

In this embodiment, the main grooves 10 each are configured as a zigzag (or wavy) groove. Alternatively, the main grooves 10 each may be configured as a straight groove. Note that widths and depths of the main grooves 10 may be set based on conventional manner. In this embodiment, the main grooves 10 have the depths D1 (shown in FIG. 1) of 25 mm.

The crown land portion 11c is divided into a plurality of crown blocks Bc by a plurality of lateral grooves 12c which traverses completely the crown land portion 11c. The middle land portion 11m is divided into a plurality of middle blocks Bm by a plurality of lateral grooves 12m which traverses completely the middle land portion 11m. The shoulder land portion 11s is divided into a plurality of shoulder blocks Bs by a plurality of lateral grooves 12s which traverses completely the shoulder land portion 11s. In this embodiment, the lateral grooves 12c and 12m have depths D2 (shown in FIG. 1) in a range of from 0.6 to 1.0 times the depths D1 of the main grooves. In this embodiment, the depths D2 are 20.5 mm. On the other hand, the lateral grooves 12s have the depths D3 (shown in FIG. 1) equal to or less than 3.0 mm. Thus, the shoulder land portion 11s may have high rigidity, leading to improved wear resistance.

Figure 3:
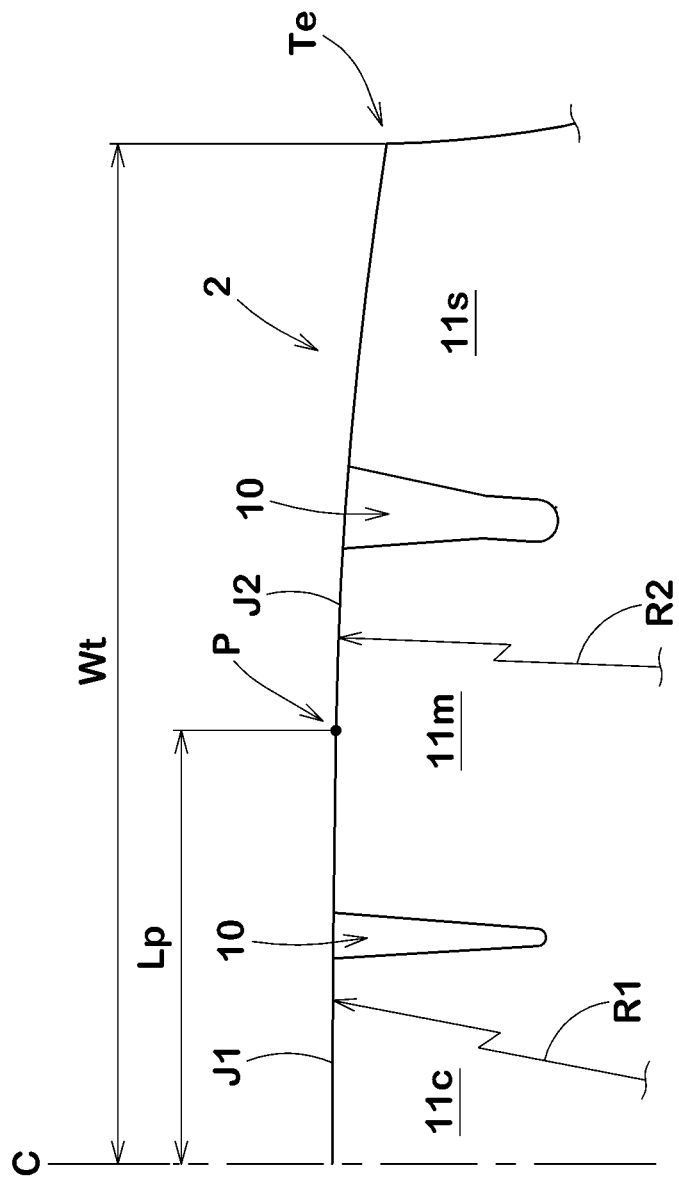
FIG. 3 is a line diagram illustrating a tread surface profile.

FIG. 3 illustrates a cross-sectional view of the tire under a 5% inflated state. As used herein, the 5% inflated state means a state in which the tire is mounted on the standard wheel rim and is inflated to 5% of the standard pressure but loaded with no tire load. Here, a tire under the 5% inflated state shows a similar shape or profile to a molding surface of a tire mold in which the tire is molded, and thus it may be regarded an intended tire shape for a design concept. As illustrated in FIG. 3, in the 5% inflated state, the tread portion 2 includes a surface profile which includes an inner arc portion J1 having a radius R1 of curvature with a center located in the tire equatorial plane C and an outer arc portion J2 intersecting the inner arc portion J1 at an inflection point P.

The radius R2 of curvature is smaller than the radius R1 of curvature, preferably the ratio R2/R1 may be in a range of from 0.14 to 0.20. Thus, a flatted tread surface profile may be obtained on the side of the tire equatorial plane.

The inflection point P is located on the middle land portion 11m. A distance Lp in the tire axial direction from the tire equatorial plane C to the inflection point P is in a range of from 0.35 to 0.50 times the tread half-width Wt.

In the heavy duty tire 1 in accordance with the present disclosure, the inflection point P is not located at the main grooves 10, but is located on the middle land portion 11m. Thus, even after inflated, a connected condition of the inner and outer arc portions J1 and J2 may be kept, and therefore the flatted tread surface profile as described above may be maintained. Thus, regardless of tire load fluctuation, a flatten circumferential end contours of the shape of the tread ground contact patch over the crown land portion 11c and the middle land portion 11m can be maintained.

In this embodiment, since the distance Lp of the inflection point P is in a range of from 0.35 to 0.50 times the distance Lp of the tread half-width Wt, the inflection point P locates nearer to the tire equatorial plane C as compared with conventional tires having a double-radius tread profile. Thus, regardless of tire load fluctuation, a flatten circumferential end contours of the shape of the tread ground contact patch over the crown land portion 11c and the middle land portions 11m can further be maintained. As a result, even under a light load condition, a ground contact pressure can be uniformed, thereby improving crown wear resistance while suppressing shoulder wear.

When the distance Lp is less than 0.35 times the tread half-width Wt, a region where the inner arc portion Ji forms may become narrower. Thus, it may be difficult to suppress crown wear sufficiently since ground contact pressure may be un-uniformed between the crown land portion 11c and the middle land portions 11m when the tire load fluctuates. On the other hand, the distance Lp is more than 0.50 times the tread half-width Wt, a circumferential ground contact length of the shoulder land portion 11s become relatively shorter than a circumferential ground contact length of the middle land portions 11m. Thus, under a light load condition, shoulder wear may occur potentially. In view of the above, the distance Lp may preferably be set equal to or more than 0.375 times, and equal to or less than 0.475 times the tread half-width Wt.

In some preferred embodiments, the ratio R2/R1 of the radius R2 of the outer arc portion J2 to the radius R1 of the inner arc portion J1 may be set in a range of from 0.14 to 0.20. This ratio may be helpful to produce flatten circumferential end contours of the crown land portion 11c of the shape of a tread ground contact patch, thereby reducing ground contact pressure acting thereon. When the ratio R2/R1 is less than 0.14, a circumferential ground contact length of the shoulder land portion 11s becomes relatively shorter than a circumferential ground contact length of the middle land portion 11m. Thus, under a light load condition, shoulder wear may occur potentially. On the other hand, the ratio R2/R1 is more than 0.20, a circumferential ground contact length of the shoulder land portion 11s becomes relatively longer than a circumferential ground contact length of the middle land portions 11m, thereby increasing ground contact pressure of the shoulder land portion 11s. In exchange for the increase of the ground contact pressure of the shoulder land portion 11s, the ground contact pressure acting on the middle land portions 11m may be lower. As a result, ground contact pressure acting on the crown land portion 11c and the middle land portion 11m tends to be un-uniformed under a light load condition, and therefore crown wear tends to occur potentially. In view of the above, the ratio R2/R1 may preferably be equal to or more than 0.16, and preferably equal to or less than 0.18.

In some preferred embodiments of the heavy duty tire 1, as described above, the half width Wb of second belt ply 7B may be set in a range of from 0.8 to 0.95 times the tread half-width Wt. When the half width Wb is less than 0.80 times the tread half-width Wt, restraint force by the belt layer 7 acting on the shoulder land portion 11s tends to be lower, thereby increasing ground contact pressure of the shoulder land portion 11s after inflated. In exchange for the increase of the ground contact pressure of the shoulder land portion 11s, the ground contact pressure acting on the middle land portions 11m may be lower. As a result, ground contact pressure acting on the crown land portion 11c and the middle land portions 11m tends to be un-uniformed under a light load condition, and therefore crown wear tends to occur potentially. When the half width Wb is more than 0.95 times the tread half-width Wt, it may be difficult to manufacture the tire since the belt edges tend to be close excessively to the tire side surfaces. In view of the above, the half width Wb may preferably be equal to or more than 0.825 times, and be preferably equal to or less than 0.925 times the tread half-width Wt.

Note that a tire having a high aspect ratio tends to be long in the ground contact length on the side of the tire equator C based on its tire profile property, as compared with a tire having a low aspect ratio. Thus, when the distance Lp is set in a range of from 0.35 to 0.50 times the tread half-width Wt such that the inflection point P tends to be close to the tire equator C as described above, a circumferential ground contact length of crown land portion 11c becomes relatively longer than a circumferential ground contact length of the shoulder land portion 11s, resulting in disadvantage for crown wear. In view of the above, the heavy duty tire 1 in accordance with the present disclosure may preferably be configured as a low aspect tire having an aspect ratio equal to or less than 80%.

Figure 4:
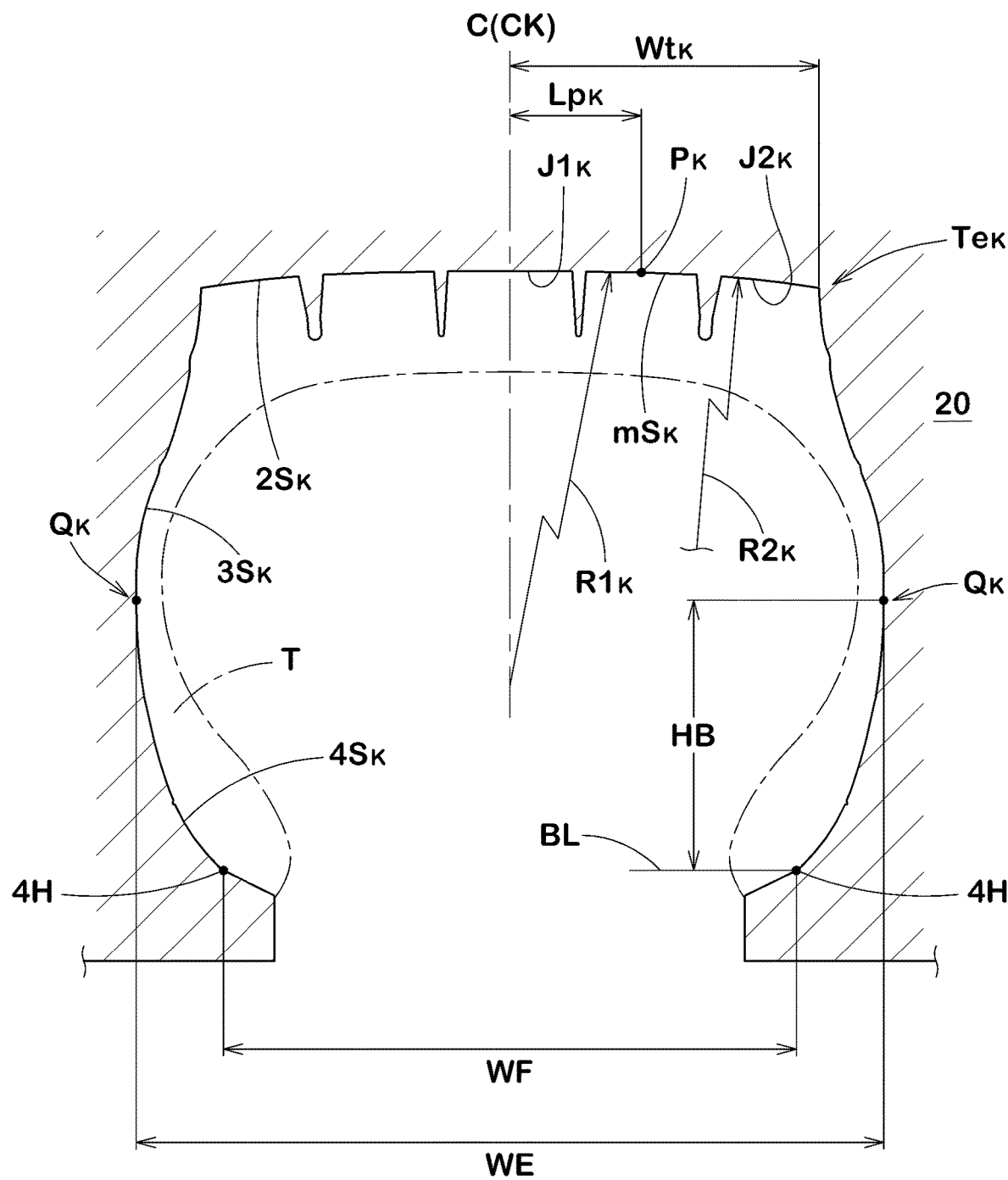
FIG. 4 is a cross-sectional view of a tire mold.

Next, a method for manufacturing the heavy duty tire 1 in accordance with the present disclosure will be explained below. As illustrated in FIG. 4, the method includes a vulcanizing step to vulcanize a raw tire T using a tire mold 20 to mold the heavy duty tire. The raw tire T may be prepared using a conventional manner, for example. Further, the vulcanizing step may be conducted using a conventional manner except for using an improved tire mold 20.

The tire mold 20 includes a cavity with an inner surface which includes a tread molding surface 2SK for molding the tread portion 2, a pair of sidewall molding surfaces 3SK for molding the sidewall portions 3 and a pair of bead molding surfaces 4SK for molding the bead portions 4.

The tread molding surface $2S_K$ has a profile which includes an inner tire-mold arc portion $J1_K$ having a radius $R1_K$ of curvature with a center located in a tire-mold equatorial plane $C_K$ and an outer tire-mold arc portion $J2_K$ having a radius $R2_K$ of curvature and intersecting the inner tire-mold arc portion $J1_K$ at an inflection point $P_K$.

The radius $R2_K$ of curvature is set smaller than the radius $R1_K$ of curvature. Preferably, a ratio $R2_K/R1_K$ of the radius $R2_K$ of curvature to the radius $R1_K$ of curvature may be in a range of from 0.14 to 0.20.

The inflection point $P_K$ is located on a middle land portion forming surface $mS_K$ of the tire mold 20 for molding the middle land portion 11m. Furthermore, a distance Lpk in an axial direction from the tire-mold equatorial plane $C_K$ to the inflection point $P_K$ is in a range of from 0.35 to 0.50 times a tire-mold tread half-width $Wt_K$. As used herein, the tire-mold tread half-width Wtk is defined as a distance in a tire-mold axial direction from the tire-mold equatorial plane $C_K$ to a tread edge forming position $Te_K$ of the tire mold 20 for molding the one of the tread edges Te.

The tire mold 20 may mold the above heavy duty tire 1 through the vulcanizing step. Note that the reasons using the tire mold 20 having the ratio $R2_K/R1_K$ being 0.14 to 0.20 and the ratio $Lp_K/Wt_K$ being 0.35 to 0.50 are respectively same as the reasons that the heavy duty tire 1 employs the ratio R2/R1 being 0.14 to 0.20 and the ratio Lp/Wt being 0.35 to 0.50.

The tire mold 20 has a tire-mold clip width WF and a tire-mold width WE, wherein a ratio WE/WF may preferably be in a range of from 1.27 to 1.37. As used herein, the tire-mold clip width WF refers to a distance in the tire-mold axial direction between a pair of bead heel forming positions for molding a pair of bead heel points 4H. As used herein, the tire-mold width WE refers to a distance in the tire-mold axial distance between a pair of sidewall maximum-width portions $Q_K$ of a pair of sidewall molding surfaces $3S_K$. In some preferred embodiments, the ratio WE/WF may be set in a range of from 1.27 to 1.37 by enlarging the tire-mold width WE while reducing the tire-mold clip width WF.

Figure 5:
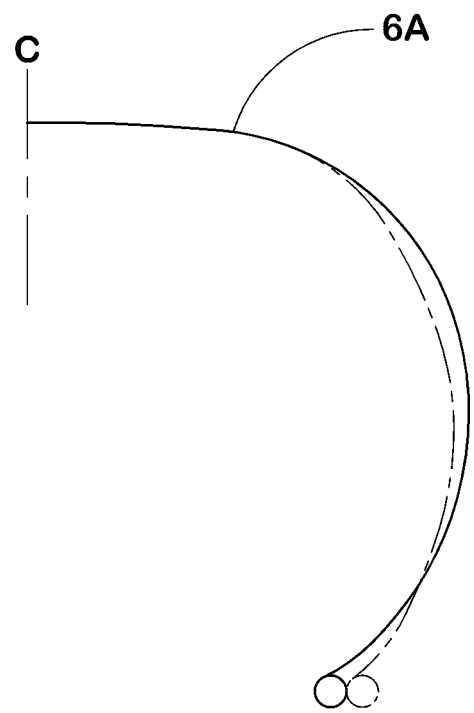
FIG. 5 is a conceptual diagram of a carcass profile for explaining effect of a ratio WE/WF.

FIG. 5 illustrates a profile of the carcass ply 6A as a conceptual diagram. As illustrated in FIG. 5, the tire manufactured by the tire mold 20 has a cord path of the carcass ply 6A (as shown in a solid line) longer than a cord path (shown in dashed line) of the carcass ply manufactured by a conventional tire mold. Thus, after inflated, a shoulder region of the tread portion can be lifted outwardly in the tire radial direction due to the longer cord path of the carcass ply 6A, resulting in suppressing shoulder wear. This may also be helpful to suppress shoulder wear to be caused by the tread portion 2 with a double radius profile.

When the ratio WE/WF is less than 1.27, it may be difficult to deliver the effect to suppress the above shoulder wear. In particular, in case that the ratio WE/WF becomes less than 1.27 due to the tire-mold clip width WF being greater, bead durability tends to be lower since strain of the bead portions 4 when being mounted on a rim becomes larger.

Further, when the ratio WE/WF exceeds 1.37 due to the tire-mold width WE being greater, the tire section width tends to be out of the tire standards. On the other hand, when the ratio WE/WF exceeds 1.37 due to the tire-mold clip width WF being smaller, air-in performance may be deteriorated since the tire-mold clip width WF tends to be close to the rim width.

In order to further increase the wear life of the heavy duty tire to be mounted on drive axle, it may also be preferable to improve crown wear resistance of the tread portion under an extra-light load condition close to unloaded condition.

In order to improve crown wear resistance of the tread portion under an extra-light load condition in addition to a light load condition, as illustrated in FIG. 4, it may be preferable that a ratio HB/WF of each of the radial heights HB to the tire-mold clip width WF is in a range of from 0.45 to 0.50. As used herein, each of the radial heights HB refers to a radial distance of the tire mold 20 from the bead base line BL to a respective sidewall maximum-width portion Q of the pair of sidewall molding surfaces $3S_K$.

Figure 6:
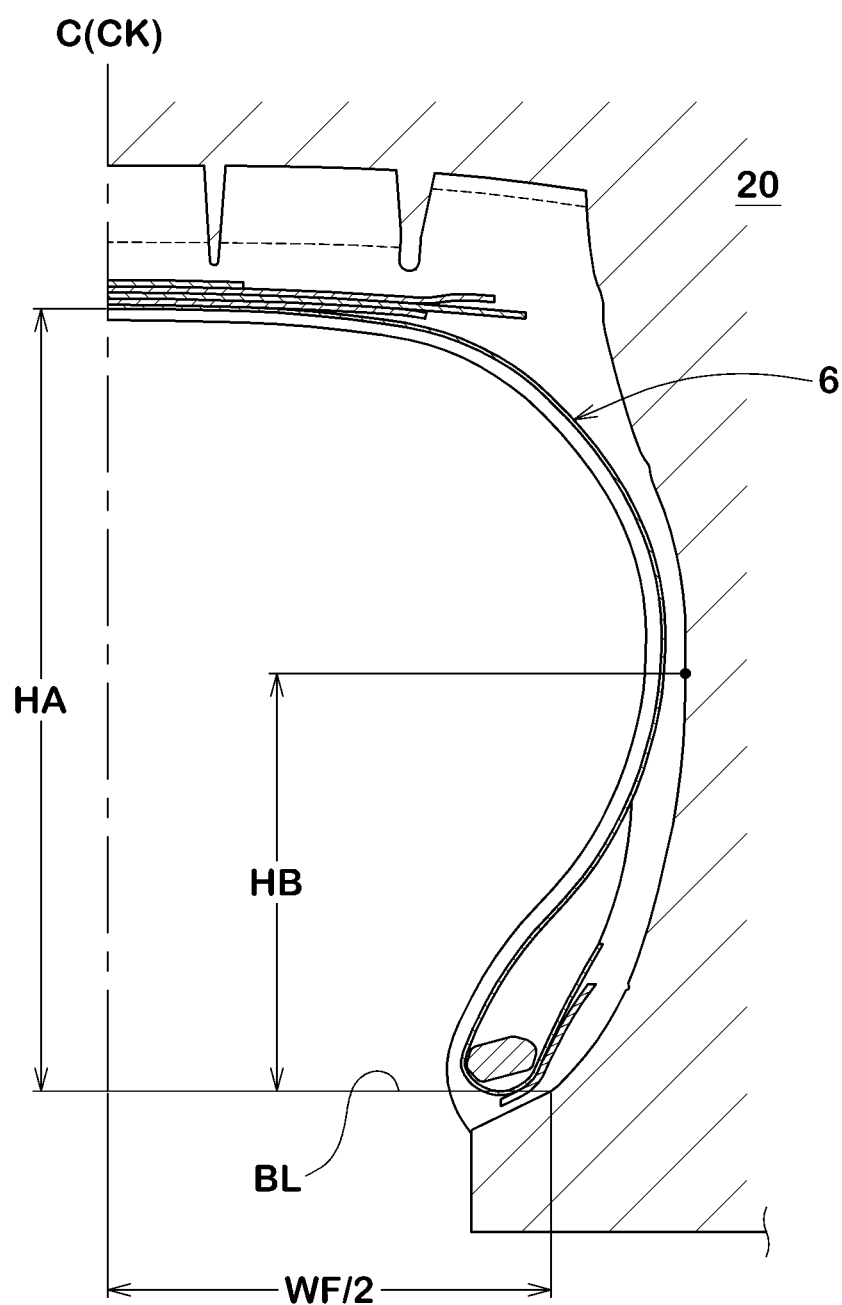
FIG. 6 is a cross-sectional view of the heavy duty tire in the tire mold in a vulcanizing state.

Further, as illustrated in FIG. 6, in the vulcanizing step, it may be preferable that the raw tire is placed in the tire mold 20 such that a ratio HB/HA of each of the radial heights HB to a radial height HA of an inner surface of the carcass 6 at the tire-mold equatorial plane $C_K$ from the bead base line BL is set in a range of from 0.4 to 0.6.

By setting the ratios HB/WF and HB/HA into the above ranges, the tire may have a carcass profile which is close to a natural balance curve. Thus, when inflated, the tire as a whole tends to expand, thereby obtaining a tread profile which is similar to the tread molding surface $2S_K$ of the tire mold 20. As a result, flatten circumferential end contours of the shape of a tread ground contact patch can be obtained.

When the ratio HB/WF exceeds 0.5, or when the ratio HB/HA exceeds 0.6, the carcass profile tends to be out of the natural balance curve. Thus, the tread surface profile deforms into a different shape from the tread molding surface 2SK of the tire mold 20, when inflated. Accordingly, it may be difficult to obtain flatten circumferential end contours of the shape of a tread ground contact patch.

Specifically, when the ratio HB/WF exceeds 0.5 or when the ratio HB/HA exceeds 0.6, the carcass profile extending in the bead portion tends to be shaped such that an angle between the carcass profile and a radial line becomes smaller. Thus, after inflated, deformation of the carcass profile in the bead portion 4 tends to increase such that the carcass profile in the tread portion 2 is pulled radially inwardly toward the bead portion 4, leading to a tread ground contact patch having rounded circumferential end contours.

When the ratio HB/WF is less than 0.45, or when the ratio HB/HA is less than 0.4, a volume of the bead portion 4 tends to be insufficient, thereby deteriorating durability.

While the particularly preferable embodiments in accordance with the present invention have been described in detail, the present invention is not limited to the illustrated embodiments, but can be modified and carried out in various aspects.

EXAMPLE

Heavy duty tires 295/75R22.5 as illustrated in FIG. 1 were manufactured using a tire mold as illustrated in FIG. 4 based on the details shown in Tables 1 to 3. Then, crown wear resistance, shoulder wear resistance, durability and a tire section width (conformance of tire standards) of each of the tires was tested In Table 1, the ratios R2/R1, $R2_K/R1_K$, Wb/Wt and WE/WF were optimized at the certain values, and then the ratios Lp/Wt and $Lp_K/Wt_K$ were varied. These tires have substantially same specifications except the values listed in Table 1.

In Table 2, the ratio of inflection points Lp/Wt and $Lp_K/Wt_K$ were optimized at the certain values, and then the ratios R2/R1, $R2_K/R1_K$, Wb/Wt and WE/WF were varied. These tires have substantially same specifications except the values listed in Table 2.

Crown and Shoulder Wear Resistance Test:

Each test tire was mounted on a rim (8.25×22.5) with an inner pressure of 750 kPa, and then was installed to the first drive axle of a truck-trailer. In Tables 1 and 2, tire load for each test tire was 60% of the load index (i.e. a light load condition). In Table 3, tire load for each test tire was 30% of the load index (i.e. an unloaded condition).

After a test driver drove the truck-trailer for 50,000 km, wear-amount of the crown and the shoulder land portions of the test tire were measured. The test results are shown in Tables using a score based on the measurements, wherein the Ex. 1 is set to 100. The larger the value, the better the wear resistance is.

Durability Test:

Using a drum tester under the following condition, traveling distance until damage occurs on the bead portions was measured:

Rim: 8.25×22.5:
Inner pressure: 750 kPa:
Running speed: 45 km/hr; and
Tire load: starting from 100% of the load index, and then increased the load by 10% every 24 hours.

The test results are shown in Tables using a score based on the measurements, wherein the Ex. 1 is set to 100. The larger the value, the better the durability is.

Air in Performance Test:

After being mounted on a rim, ease of inflating each test tire was evaluated. The test results are shown in Tables using a score based on the measurements, wherein the Ex. 1 is set to 100. The larger the value, the better the air-in performance is.

Tire Section Width Test (Conformance of Tire Standards):

The section width of each test tire was measured, and was checked whether it meets the tire standards.

Tire Productivity Test:

In a forming step of a raw tire and the vulcanizing step, it was checked whether troubles due to a width of the belt layer occur.

TABLE 1

|  | Ex. 1 | Ref. 1 | Ex. 2 | Ex. 3 | Ref. 2 |
|---|---|---|---|---|---|
| <Tire> |  |  |  |  |  |
| Lp/Wt | 0.425 | 0.30 | 0.35 | 0.50 | 0.55 |
| R2/R1 |  |  | 0.17 |  |  |
| Wb/Wt |  |  | 0.875 |  |  |
| <Tire mold> |  |  |  |  |  |
| $Lp_K/Wt_K$ | 0.425 | 0.30 | 0.35 | 0.50 | 0.55 |
| $R2_K/R1_K$ |  |  | 0.17 |  |  |
| WE/WF |  |  | 1.32 |  |  |
| HB/HA |  |  | 0.5 |  |  |
| HB/WF |  |  | 0.475 |  |  |
| Crown wear resistance (light load condition) | 100 | 80 | 95 | 110 | 115 |
| Shoulder wear resistance (unloaded condition) | 100 | 115 | 110 | 95 | 80 |
| Durability | 100 | 100 | 100 | 100 | 100 |
| Tire section width | passed | passed | passed | passed | passed |
| Air-in performance | 100 | 100 | 100 | 100 | 100 |
| Tire productivity | 100 | 100 | 100 | 100 | 100 |

TABLE 2

|  | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 |
|---|---|---|---|---|---|---|---|---|---|---|---|---|
| <Tire> |  |  |  |  |  |  |  |  |  |  |  |  |
| Lp/Wt | 0.425 |  |  |  |  |  |  |  |  |  |  |  |
| R2/R1 | 0.12 | 0.14 | 0.2 | 0.22 |  |  |  |  | 0.17 |  |  |  |
| Wb/Wt |  |  |  |  | 0.875 |  |  |  |  | 0.75 | 0.80 | 0.95 | 1.00 |
| <Tire mold> |  |  |  |  |  |  |  |  |  |  |  |  |
| $Lp_K/Wt_K$ |  |  |  |  |  |  | 0.425 |  |  |  |  |  |
| $R2_K/R1_K$ | 0.12 | 0.14 | 0.2 | 0.22 |  |  |  |  | 0.17 |  |  |  |
| WE/WF |  |  | 1.32 |  | 1.22 | 1.27 | 1.37 | 1.42 |  |  | 1.32 |  |
| HB/HA |  |  |  |  |  | 0.5 |  |  |  |  |  |  |
| HB/WF |  |  |  |  |  | 0.475 |  |  |  |  |  |  |
| Crown wear resistance (light load condition) | 115 | 110 | 95 | 90 | 90 | 95 | 110 | 115 | 90 | 95 | 110 | 115 |
| Shoulder wear resistance (unloaded condition) | 90 | 95 | 110 | 115 | 90 | 95 | 110 | 115 | 90 | 95 | 110 | 115 |
| Durability | 100 | 100 | 100 | 100 | 90 | 95 | 110 | 115 | 100 | 100 | 100 | 100 |
| Tire section width | passed | passed | passed | passed | passed | passed | passed | NG | passed | passed | passed | passed |
| Air-in performance | 100 | 100 | 100 | 100 | 115 | 110 | 95 | 90 | 100 | 100 | 100 | 100 |
| Tire productivity | 100 | 100 | 100 | 100 | 100 | 100 | 100 | 100 | 115 | 110 | 95 | 90 |

As shown in Tables 1 and 2, it is confirmed that the example tires exhibit better crown wear resistance while suppressing excessively lowering shoulder wear resistance under the light load condition (i.e. the tire load of 60% of the load index). In the crown wear resistance and shoulder wear resistance test under the light load condition, the score may preferably be equal to or more than 90 points.

In Table 3, the ratios Lp/Wt, LpK/WtK, R2/R1, R2K/R1K, Wb/Wt and WE/WF were optimized as shown in Table, and the ratios HB/WF and HB/HA were varied. These tires have substantially same specifications except the values listed in Table 3. Note that in Table 3, crown wear resistance, shoulder wear resistance and durability were tested.

TABLE 3

| | Ex. 1 | Ex. 16 | Ex. 17 | Ex. 18 | Ex. 19 | Ex. 20 | Ex. 21 | Ex. 22 | Ex. 23 |
|---|---|---|---|---|---|---|---|---|---|
| <Tire> | | | | | | | | | |
| Lp/Wt | | | | | 0.425 | | | | |
| R2/R1 | | | | | 0.17 | | | | |
| Wb/Wt | | | | | 0.875 | | | | |
| <Tire mold> | | | | | | | | | |
| $Lp_K/Wt_K$ | | | | | 0.425 | | | | |
| $R2_K/R1_K$ | | | | | 0.17 | | | | |
| WE/WF | | | | | 1.32 | | | | |
| HB/HA | 0.5 | 0.3 | 0.4 | 0.6 | 0.7 | 0.5 | | | |
| HB/WF | | | 0.475 | | | 0.425 | 0.45 | 0.5 | 0.525 |
| Crown wear resistance (light load condition) | 100 | 110 | 105 | 95 | 85 | 110 | 105 | 95 | 85 |
| Shoulder wear resistance (unloaded condition) | 100 | 110 | 105 | 95 | 85 | 110 | 105 | 95 | 85 |
| Durability | 100 | 85 | 95 | 105 | 105 | 85 | 95 | 105 | 105 |

As shown in Table 3, by adjusting the ratios HB/WF and HB/HA, it is confirmed that the example tires exhibit better crown wear resistance while suppressing excessively lowering shoulder wear resistance under unloaded condition (i.e. the tire load of 30% of the load index). In the crown wear resistance and shoulder wear resistance test under the unloaded condition, the score may preferably be equal to or more than 90 points.

What is claimed is:

1. A heavy-duty tire comprising:
   a tread portion having a pair of axially outermost tread edges;
   a pair of bead portions each with a bead core therein;
   a pair of sidewall portions;
   a carcass extending between the pair of bead cores through the tread portion and the pair of sidewall portions; and
   a belt layer disposed outwardly in a tire radial direction of the carcass in the tread portion and comprising three or four belt plies of belt cords, wherein
   the tread portion is provided with a plurality of main grooves extending in a tire circumferential direction to form a crown land portion, a shoulder land portion including one of the pair of axially outermost tread edges and a middle land portion disposed between the crown land portion and the shoulder land portion, the plurality of main grooves comprising a shoulder main groove between the shoulder land portion and the middle land portion, the shoulder main groove extending in a zigzag manner in the tire circumferential direction so as to have a plurality of outer zigzag peaks that protrudes axially outwardly of the tire,
   in a tire cross-section of a 5% inflated state in which the tire is mounted on a standard wheel rim and is inflated to 5% of a standard pressure, the tread portion comprises a surface profile which comprises
      an inner arc portion having a radius (R1) of curvature with a center located in a tire equatorial plane and
      an outer arc portion having a radius (R2) of curvature smaller than the radius (R1) of curvature of the inner arc portion and intersecting the inner arc portion at an inflection point (P),
   the inflection point (P) is located on the middle land portion, wherein a distance (Lp) in the tire axial direction from the tire equatorial plane to the inflection point (P) is in a range of from 0.35 to 0.50 times a tread half-width (Wt) which is a distance in the tire axial direction from the tire equatorial plane to said one of the pair of axially outermost tread edges,
   the shoulder land portion is provided with a plurality of shoulder lateral grooves each extending from a respective one of the plurality of outer zigzag peaks of the shoulder main groove to said one of the axially outermost tread edges so as to traverse the shoulder land portion completely in the tire axial direction such that the shoulder land portion is divided into a plurality of shoulder blocks each having a pentagonal ground contacting surface where no other grooves are provided,
   the shoulder lateral grooves each have depths equal to or less than 3.0 mm,
   the middle land portion is divided into a plurality of middle blocks by a plurality of lateral grooves traversing the middle land portion completely in the tire axial direction,
   the plurality of lateral grooves on the middle land portion has a depth D2 in a range of from 0.6 to 1.0 times depths D1 of the plurality of main grooves, and
   the shoulder lateral grooves each have depths equal to or less than 3.0 mm over an entire length thereof.

2. The heavy-duty tire according to claim 1, wherein a ratio (R2/R1) of the radius (R2) of curvature to the radius (R1) of curvature is in a range of from 0.14 to 0.20.

3. The heavy-duty tire according to claim 1, wherein the belt plies comprise a first belt ply, a second belt ply and a third belt ply arranged in sequence from inside to the outside in the tire radial direction, the second belt ply has the greatest width in the belt plies, and a half width of the second belt ply is in a range of from 0.80 to 0.95 times the tread half-width.

4. The heavy-duty tire according to claim 1, wherein the tire has an aspect ratio equal to or less than 80%.

5. The heavy-duty tire according to claim 1, wherein
the crown land portion is divided into a plurality of crown blocks by a plurality of lateral grooves traversing the crown land portion completely in the tire axial direction, and
the plurality of lateral grooves on the crown land portion has a depth $D2$ in a range of from 0.6 to 1.0 times depths $D1$ of the plurality of main grooves.

6. The heavy-duty tire according to claim 5, wherein
the plurality of shoulder lateral grooves has a depth smaller than that of the plurality of lateral grooves on the crown and middle land portions.

7. The heavy-duty tire according to claim 6, wherein
each of the plurality of crown blocks and the plurality of middle blocks has a hexagonal shape.

8. The heavy-duty tire according to claim 1, wherein
the crown land portion is divided into a plurality of crown blocks by a plurality of lateral grooves traversing the crown land portion completely in the tire axial direction, and
the plurality of lateral grooves on the crown land portion has a depth $D2$ in a range of from 0.6 to 0.82 times depths $D1$ of the plurality of main grooves.

9. The heavy-duty tire according to claim 8, wherein
the middle land portion is divided into a plurality of middle blocks by a plurality of lateral grooves traversing the middle land portion completely in the tire axial direction, and
the plurality of lateral grooves on the middle land portion has a depth $D2$ in a range of from 0.6 to 0.82 times depths $D1$ of the plurality of main grooves.

10. The heavy-duty tire according to claim 1, wherein
the middle land portion is divided into a plurality of middle blocks by a plurality of lateral grooves traversing the middle land portion completely in the tire axial direction, and
the plurality of lateral grooves on the middle land portion has a depth $D2$ in a range of from 0.6 to 0.82 times depths $D1$ of the plurality of main grooves.

11. The heavy-duty tire according to claim 1, wherein
the plurality of main grooves consists of four main grooves.

12. The heavy-duty tire according to claim 1, wherein
the plurality of main grooves consists of five main grooves.

13. The tire according to claim 1, wherein
each of the plurality of shoulder lateral grooves has a constant depth over an entire length thereof.

14. The tire according to claim 13, wherein
no sipes are provided on each pentagonal ground contacting surface.

15. The tire according to claim 1, wherein
no sipes are provided on each pentagonal ground contacting surface.

\* \* \* \* \*